Dec. 13, 1927.

T. J. LEWIS 1,652,537

CLEANSING CREAM FILLER

Filed June 19, 1926

Inventor
Thomas J. Lewis
By his Attorney
George C. Heinitz

Patented Dec. 13, 1927.

1,652,537

UNITED STATES PATENT OFFICE.

THOMAS J. LEWIS, OF NEW YORK, N. Y.

CLEANSING-CREAM FILLER.

Application filed June 19, 1926. Serial No. 117,109.

The present invention relates to improvements in filling apparatus particularly a cleansing cream filler, and it is the principal object of the invention to provide a filler allowing the simultaneous filling of a plurality of jars, and a simultaneously closing of the filler nozzles.

Another object of the invention is the provision of a filling apparatus of simple and inexpensive construction, yet durable and efficient and positively operating.

A further object of the invention is the provision of a cleansing cream filler, comprising a novel clamping means for readily and conveniently closing a plurality of filler nozzles in one operation.

These and other objects and advantages of my invention will become more fully known as the description thereof proceeds, and will then be specifically defined in the appended claims.

In the accompanying drawing forming a material part of this disclosure:

The filler horn 10 is made of any suitable material and appropriately shaped, for instance, as shown, and is adapted to be filled with cleansing cream from a suitable supply in any desired convenient manner, preferably under pressure.

Figure 1:
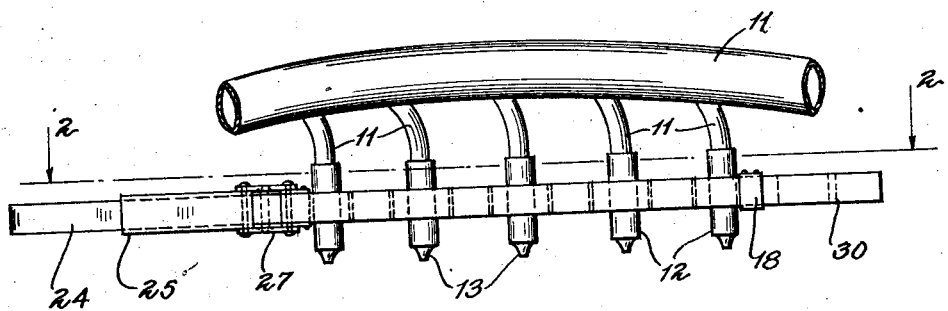
Fig. 1 is a side elevation of a cleansing cream filler constructed according to my invention.
Figure 2:
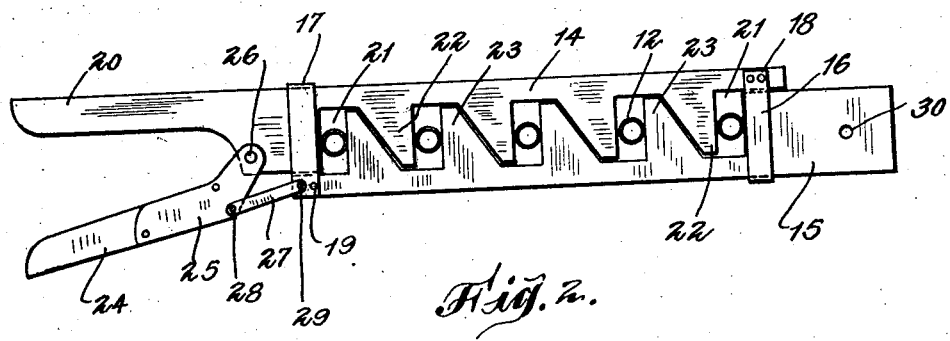
Fig. 2 is a top plan view of a clamping device seen in the direction of arrows 2—2 of Fig. 1.

A plurality of nipples 11 branch off from horn 10 and are adapted to receive each exchangeably attached thereto, in any suitable manner, a short length rubber hose 12 having lower warts 13. When the receptacles or jars for the reception of the cream are filled to a desired degree, the flow of the cream through all of the nipples is simultaneously cut off by the instrument or implement shown in Fig. 2 and described herebelow, which comprises two members 14 and 15 held together for relative sliding movement by bands 16 and 17 respectively, having their ends secured as at 18 with respect to band 16 to member 14 and at 19 with respect to band 17 to member 15 at the end opposite to band 16.

Member 14 has one of its ends formed into a handle 20 and its body is cut out at certain intervals, as for instance, at 21 to form depending, substantially triangularly shaped tongues 22.

The member 15 has its body similarly cut out to form a plurality of substantially triangular tongues 23, oppositely directed to tongues 22, so that the vertical edges of the tongues of one member, are oppositely disposed to the vertical edges of the tongues of the other member and normally spaced therefrom, while the slanting edges of the tongues of member 14 are parallel to and normally in close relation to the slanting edges of the tongues of member 15. A handle 24 has its rear end encased as at 25 and pivotally secured as at 26 near the lower inner edge of handle 20, while a pair of links 27 is pivotally secured with one of its ends as at 28 to the lower edge of casing 25 for handle 24, and at its other end as at 29 to the inner end of hand 17.

An opening 30 allows the suspension of the instrument from any suitable support.

The device operates as follows:

The cream to be filled into the jars, etc., is brought into the horn 10 and subjected to a certain pressure so that it will readily flow through the nipples 11, hose stem 12, and nipples 13 thereof, into the jars. If the jars are filled to the desired capacity, the clamping device is operated by operating handle 24 to engage handle 20. It will be clear that by this operation the member 15 will be drawn towards the left, so that the straight edges of tongues 23, opposite to straight edges of tongues 22 squeeze the hose stems 12 between them, to close the same for stopping the further feeding of the cream to the jars.

It is to be understood that such changes as fall within the scope of the appended claims may be made in the preferred form of my device shown and described without departure from the invention.

Having thus described my invention, what I claim as new, and desire to secure by Letters Patent is:

1. A clamp for jar filling apparatus of the class described, comprising a pair of members adapted to be displaced relatively to each other in the direction of their longitudinal axes, means for guiding said members in their relative motions, a plurality of tongues on each of said members, the tongues on one of said members oppositely directed to the tongues on the other member, at the inner edges of said members, in spaced relation to each other, a handle integral with one of said members, and an operating lever pivotally connected to said handle and the other member for operating said clamp.

2. A clamp for jar filling apparatus having a plurality of filler nozzles, said clamp comprising two members adapted to be placed relatively to each other in the direction of their longitudinal axes, bands secured to one of the members at one end forming a guide loop in which the other of said members slides at their other end, tongues formed at the inner edges to each member directed in opposite direction and in spaced relation, the tongues of one member fitting into the spaces between two tongues of the other member forming spaces for the passage of said nozzles, a handle integral with one of said members, an operating lever pivotally attached at one end to said handle, a link pivotally attached to said lever, and pivotally attached at the other end to the other of said members for allowing a relative movement of both members to each other in opposite direction to guide the tongues of one member against the tongues of the other member for squeezing the nozzles between the tongues to interrupt the flow of material to the jars in all nozzles simultaneously.

3. A clamp for jar filling apparatus of the class described including a plurality of nozzles, comprising a pair of longitudinally extending parallel members slidably guided for displacement against each other in the direction of their longitudinal axes, having their inner, oppositely disposed edges formed with a plurality of recesses, substantially triangularly shaped tongues formed by each adjoining pair of the recesses in such manner as to allow the tongues of one member to enter the recesses in the other member in spaced relation to the walls of the recesses, means for guiding said members, means for allowing a displacement of one member against the other in the direction of their longitudinal axes for simultaneously closing the nozzles in the space between the tongues and walls of the recesses.

4. A clamp for jar filling apparatus of the class described including a plurality of nozzles, comprising a pair of longitudinally extending parallel members, guides for slidably guiding said members allowing their displacement in the direction of their longitudinal axes, each of said members having recesses in its inner edge, substantially triangular tongues formed with the inner edge of each member, the tongues of one member adapted to engage into the recesses of the other in spaced relation to the walls of the recesses, each of said tongues having a straight rear edge oppositely disposed to the rear edge of the recess receiving said tongue and normally spaced therefrom to receive the nozzles, means for displacing the two members against each other for closing the spaces and the nozzles therein simultaneously to interrupt the filling process.

In testimony whereof I affix my signature.

THOMAS J. LEWIS.